UNITED STATES PATENT OFFICE 2,578,688

VINYL RESINS PLASTICIZED WITH TRIMETHYLOL PROPANE TRIOCTANOATE

George L. Fraser, Springfield, Mass., assignor to Monsanto Chemical Company, St. Louis, Mo., a corporation of Delaware No Drawing. Application September 25, 1948, Serial No. 51,317

9 Claims. (Cl. 260—31.2)

This invention relates to vinyl chloride polymer compositions. More particularly, this invention relates to plasticized vinyl chloride polymers.

It is an object of this invention to provide plasticized vinyl chloride polymer compositions. A further object of this invention is to provide plasticized vinyl chloride polymer compositions having a high plasticizer retentivity. A particular object of this invention is to provide plasticized polyvinyl chloride compositions.

These and other objects are accomplished according to this invention by plasticizing vinyl chloride polymers with 1,1,1-trimethylol propane trioctanoate. Thus, it is unexpectedly found that 1,1,1-trimethylol propane trioctanoate may be associated with vinyl chloride polymers to provide plasticized compositions. Furthermore, these compositions have the valuable characteristic of retaining plasticizer to a substantial degree even when thin films of the compositions are heated at elevated temperatures.

The following examples are illustrative of the present invention but are not to be construed as limitative thereof. Where parts are mentioned, they are parts by weight.

Example I 100 parts of polyvinyl chloride are mixed with 40 parts of 1,1,1-trimethylol propane trioctanoate on milling rolls at a temperature of 150° C. to form a homogeneous composition. A portion of the product is pressed into sheets about 0.020 inch in thickness. These sheets are transparent and light in color. On exposure for three days to an atmosphere having a relative humidity of 80% and a temperature of 25° C., no exudation occurs.

It is found that the plasticized composition of Example I has the following characteristics:

Shore hardness on the A scale _____ 83
Flex temperature (Clash - Berg tester)
°C__ −30
Loss of weight on heating films 0.020 inch in thickness at 105° C. for 24 hours per cent___ 0.7

In addition to the above characteristics, the composition of Example I is found to have excellent stability against discoloration on heating. Also, films of the composition of Example I show only slight evidence of migration of the plasticizer when placed in contact with either shellac or plasticized cellulose nitrate surfaces for seven days at 25° C. and at a relat've humidity of 50%.

Example II

Example I is repeated except that the amount of plasticizer is increased from 40 parts to 55 parts. The composition which results is found to be generally similar to the composition of Example I. In particular, the composition of this example is found to yield clear films which show no evidence of exudation on exposure to an atmosphere having a relative humidity of 80% and a temperature of 25° C.

Example III

A mixture of 100 parts of a copolymer of vinyl chloride and vinyl acetate (90% vinyl chloride and 10% vinyl acetate) and 50 parts of 1,1,1-trimethylol propane trioctanoate is kneaded at a temperature of 150° C. to form a homogeneous composition. Films prepared from this composition are found to possess the unexpected and valuable characteristics of the product of Example I, e. g., freedom from exudation, low weight loss on heating, good heat stability and freedom from migration of plasticizer into shellac and other finishes.

Example IV

Example III is repeated except that a vinyl-chloride-diethyl maleate copolymer (90% vinyl chloride and 10% diethyl maleate) replaces the vinyl chloride-vinyl acetate copolymer. The plasticized composition exhibits the characteristic properties of the compositions of the invention.

It is surprising that 1,1,1-trimethylol propane trioctanoate may be incorporated with vinyl chloride polymers in such substantial quantities and still produce homogeneous compositions which are free from exudation of the plasticizer. Thus, in contrast to the products of the invention, a composition made up of 100 parts of polyvinyl chloride and 50 parts of glyceryl trioctanoate exudes plasticizer immediately upon cooling to room temperature. In further contrast to the compositions of the invention, 1,1,1-trimethylol propane tridecanoate is not compatible with polyvinyl chloride and attempts to mill a mixture of 50 parts of this plasticizer with 100 parts of polyvinyl chloride at 150° C. are unsuccessful in that a coherent sheet does not form.

The amount of 1,1,1-trimethylol propane trioctanoate which is incorporated with vinyl chloride polymers may be substantially varied depending upon the type of composition which is desired. When 1,1,1-trimethylol propane trioctanoate is used as the sole plasticizer, it is usually found that at least 25 parts of plasticizer are desirable for every 100 parts of polymer. Smaller proportions of 1,1,1-trimethylol propane trioctanoate may be used if other plasticizers are also present. For example, a mixture of 10-40 parts of 1,1,1-trimethylol propane trioctanoate and 40-10 parts of dioctyl phthalate may be used to plasticize 100 parts of polyvinyl chloride or other vinyl chloride polymers. The upper limit of the amount of plasticizer used is usually determined by the amount that is compatible with the particular polymer composition. As shown by Example II, as much as 55 parts of the plasticizer of the invention are compatible with polyvinyl chloride.

As indicated above, 1,1,1-trimethylol propane trioctanoate may be used in conjunction with other plasticizers such as dioctyl phthalate, tricresyl phosphate or mixtures of these and other plasticizers.

1,1,1-trimethylol propane trioctanoate may be used to plasticize vinyl chloride polymers generally. Thus, in place of polyvinyl chloride, this plasticizer may be used in conjunction with various copolymers of vinyl chloride and other unsaturated materials copolymerizable therewith. Examples of such copolymers include copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate and the corresponding esters of methacrylic acid; vinyl aromatic compounds, for example, styrene, orthochloro-styrene, para-chlorostyrene, 2,5-dichlorostyrene, 2,4-dichlorostyrene, para-ethyl styrene, vinyl naphthalene, alpha-methyl styrene; dienes, such as butadiene, chloroprene; amides, such as acrylic acid amide, acrylic acid anilide; nitriles, such as acrylic acid nitrile, esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. Usually at least 10% of the copolymer is vinyl chloride and the class of copolymers in which a predominant portion, i. e., more than 50% by weight of the copolymer is made from vinyl chloride, represents a preferred class of polymers to be plasticized according to the invention.

A particularly preferred embodiment of the invention comprises the plasticization of polymers prepared by copolymerizing vinyl chloride and an ester of an $\alpha,\beta$-unsaturated dicarboxylic acid such as diethyl maleate, in which 5-30 parts by weight of the ester are used for every 95-70 parts by weight of vinyl chloride. Among the preferred esters of $\alpha,\beta$-unsaturated dicarboxylic acids are the alkyl esters in which the alkyl group contains 1-8 carbon atoms.

It is obvious that many variations may be made in the processes and products of this invention without departing from the spirit and scope thereof as defined in the appended claims.

What is claimed is:

1. A composition comprising a vinyl chloride-containing polymer and an amount of 1,1,1-trimethylol propane trioctanoate which is compatible therewith.

2. A composition as defined by claim 1 in which the polymer is polyvinyl chloride.

3. A product as defined in claim 1 in which the polymer is a copolymer of vinyl chloride and a vinyl ester of a saturated aliphatic acid.

4. A composition as defined in claim 1 in which the polymer is a copolymer of vinyl chloride and vinyl acetate.

5. A product as defined in claim 1 in which the polymer is a copolymer of vinyl chloride and an ester of an $\alpha,\beta$-unsaturated dicarboxylic acid.

6. A product as defined in claim 1 in which the polymer is a copolymer of vinyl chloride and diethyl maleate.

7. A composition comprising 100 parts of polyvinyl chloride and 25-55 parts of 1,1,1-trimethylol propane trioctanoate.

8. A composition as defined in claim 1 which also contains an amount of dioctyl phthalate which is equal to the amount of 1,1,1-trimethylol propane trioctanoate.

9. A composition comprising 100 parts of polyvinyl chloride, 10-40 parts of 1,1,1-trimethylol propane trioctanoate and 40-10 parts of dioctyl phthalate.

GEORGE L. FRASER.

REFERENCES CITED

The following references are of record in the file of this patent:

UNITED STATES PATENTS

| Number | Name | Date |
|---|---|---|
| 2,379,976 | Maddock | July 10, 1945 |

FOREIGN PATENTS

| Number | Country | Date |
|---|---|---|
| 878,665 | France | Oct. 26, 1942 |